United States Patent [19]
Sommer

[11] Patent Number: 5,669,293
[45] Date of Patent: Sep. 23, 1997

[54] DEVICE FOR PEELING ELONGATED VEGETABLES

[76] Inventor: Felix Sommer, Am Weckersgraben 7, D-79436 Buggingen, Germany

[21] Appl. No.: 602,777
[22] PCT Filed: Aug. 31, 1994
[86] PCT No.: PCT/EP94/02877
　§ 371 Date: Mar. 7, 1996
　§ 102(e) Date: Mar. 7, 1996
[87] PCT Pub. No.: WO95/07030
　PCT Pub. Date: Mar. 16, 1995

[30] Foreign Application Priority Data

Sep. 7, 1993 [DE] Germany ............ 43 30 173.8

[51] Int. Cl.⁶ .................. A23N 7/00; A23N 7/04
[52] U.S. Cl. .............. 99/589; 99/541; 99/590; 99/591
[58] Field of Search .............. 99/584, 588–599, 99/540, 541; 426/481–483; 30/300–302

[56] References Cited

U.S. PATENT DOCUMENTS

| 4,212,237 | 7/1980 | Hsu ............... 99/589 |
| 4,446,782 | 5/1984 | Black ............. 99/591 X |
| 5,146,681 | 9/1992 | Haghkar .......... 30/123.5 |

FOREIGN PATENT DOCUMENTS

| 219 854 | 4/1909 | Germany . |
| 342443 | 10/1921 | Germany . |
| 537046 | 10/1931 | Germany . |
| 1757433 | 7/1971 | Germany . |
| 2256899 | 6/1974 | Germany ............ 99/589 |
| 24 25 932 | 5/1975 | Germany . |
| 78 16 311 | 5/1978 | Germany . |
| 9203558 U | 6/1992 | Germany . |

Primary Examiner—Timothy F. Simone
Attorney, Agent, or Firm—Panitch Schwarze Jacobs & Nadel, P.C.

[57] ABSTRACT

The invention concerns a device for peeling elongated vegetables, preferably asparagus. The device has a housing (2) with a passage (4) designed to permit a stick of asparagus (50) to be inserted. Inside the housing (2) are several peeling blades (12, 12') which are disposed in different directions of the passage (4) and act on the stick of asparagus (50). At least one of the blades (12, 12') can move crosswise to the longitudinal direction (6) of the passage (4) and presses flexibly against the stick of asparagus (50). The blades (12, 12') each have a cutting edge (19, 19') preceded in the peeling direction (23) by a feeler (20, 20'). During the peeling operation, the feeler (20, 20') lies against the stick of asparagus and guides the blade (12, 12') tangentially along the outside surface of the stick (50). The device enables sticks of asparagus (50) of differing diameter to be peeled simply in one operation round the whole of their peripheral area.

29 Claims, 11 Drawing Sheets

DEVICE FOR PEELING ELONGATED VEGETABLES

FIELD OF THE INVENTION

The invention relates to a device for peeling asparagus and similar elongated vegetables, including a passage for passing the vegetable through and arranged in the region of the passage at least one peeling blade which acts upon the periphery of the vegetable and presses flexibly against the vegetable, wherein the cutting edge (19) of the peeling blade is preceded in the peeling direction (23) by at least one feeler (20, 20') which lies against the periphery of the vegetable to be peeled and is connected substantially rigidly to the peeling blade, wherein each peeling blade is held on, and is capable of swivelling relative to, a blade arm mounted so as to be capable of swinging out crosswise to the longitudinal direction of the passage against a restoring force and each peeling blade has a cross section in the shape of a circle segment.

BACKGROUND OF THE INVENTION

Manually peeling asparagus, for example, is laborious and time-coasting, because every single stick has to be peeled in several stages, each stage removing only a strip of the outside skin of the asparagus. After one strip has been removed, the asparagus has to be turned through a certain angle about its longitudinal axis relative to the peeler, so that the next strip can be peeled. If the angle selected is too large, an unpeeled area is left between the two strips.

That strip then has to be peeled off separately in an extra step. Since, however, the peeled portion of the outer skin of the asparagus is difficult to distinguish from the unpeeled portion, the person peeling the asparagus may fail to notice that it has been turned through too large an angle and therefore not all the skin is removed. There is this risk particularly if relatively large quantities of asparagus are to be peeled and after some time the person doing so becomes inattentive or careless due to the work being monotonous and offering little in the way of relief.

It is also difficult for persons inexperienced in peeling to keep the depth of cut constant. In this case islands of unremoved skin may be formed between the individual peeled strips. To avoid this, the tendency is usually to select a greater depth of cut and/or a smaller angle of turn, resulting in the removal of an unnecessarily large amount of material.

The uneven depth of cut can be largely precluded by using already known implements having a swivel-mounted blade with a cutting edge arranged in a slit. However these implements represent only a minor improvement, because the asparagus still has to be peeled in a tedious working process involving several stages.

Since the relatively thin asparagus is difficult to grasp during peeling and since the sharp blade has to be moved very closely past the hand holding the asparagus, there is considerable risk of injury when peeling asparagus manually.

Therefore a peeling device of the kind mentioned at the outset has been provided which has a passage through which the vegetable to be peeled can be passed by means of a feeding device (cf. DE-U-78 16 311). Several peeling blades are provided in the region of the passage, these being arranged in pairs on mutually opposed sides of the passage and acting upon the periphery of the vegetable. The peeling blades of the known device are held on and are capable of swivelling relative to the blade arm. The blade arms for their part are mounted so as to be capable of swinging out crosswise to the longitudinal direction of the passage against a restoring force. During the peeling operation, the peeling blades of circle segment shape in cross section flexibly press against the vegetable to be peeled. As this vegetable is advanced, the straight cutting edges of the blades pare the outer skin or layer in strips.

By means of the blade arms mounted so as to be capable of swinging out against a restoring force and by means of the peeling blades capable of swivelling relative to the blade arms, the known device enables such vegetables to be peeled as are non-uniform in cross section over their length. However, even when cutting into the vegetable such swivel-mounted peeling blades are liable not to fully encompass the skin and then not to peel the skin completely in a satisfactory way.

DE-A-17 57 433 has disclosed a peeling device with peeling blades held rigidly in the blade arms displaceable crosswise to the longitudinal direction of the passage. As the peeling blades are fastened rigidly, they are less able to adapt to any cross-sectional anomalies of the vegetable to be peeled. For this reason it is necessary with this known device that, for instance, the eyes in the asparagus skin first be shaved off before the peeling blades come into engagement. This requires an additional working step and may also have an effect on the peeling result.

SUMMARY OF THE INVENTION

Therefore the object underlying the invention is particularly to provide a device of the kind mentioned at the outset, permitting asparagus and similar elongated vegetables to be peeled quickly and simply even on a relatively large scale, practically without risk of injury, even in manual operation of the device. The vegetable is to be peeled with as little waste as possible and with a minimum of skin left on the vegetable.

This object is accomplished according to the invention in the device of the kind mentioned at the outset particularly in that the peeling blade or peeling blades have a concave cutting edge.

Since the peeling blades are swivel-supported on the blade arms mounted so as to be capable of swinging out crosswise to the longitudinal direction of the passage, they can adapt well to the unevennesses of a vegetable. As the peeling blades are shaped according to the outer contour of the vegetable and have a circular arc-shaped cross section, the vegetable can be peeled round the whole of its peripheral area with only a few peeling blades. An especial advantage of the device embodying the invention is that the peeling blades have a concave cutting edge pointing or oriented with its circular arc shape radially in the direction of insertion. Thus when cutting into the vegetable, the peeling blades can penetrate better into its skin by virtue of their concave cutting edge.

Since the device embodying the invention can be stood or can be held outside the area of the passage, far away from the peeling blades, the peeling operation involves virtually no risk of injury. The device in keeping with the invention reduces the peeling operation to only one activity, namely pushing the vegetable through, enabling vegetables to be peeled even on a relatively large scale within the shortest amount of time.

Since vegetables are generally not constant in diameter over their length, at least one of the blades is movable in the crosswise direction of the passage and is flexibly deflected towards the vegetable by force of pressure.

In a preferred embodiment of the invention, the swivel axis of the blade arms is spaced upstream of the cutting edge. Here and in the following description, the terms upstream and downstream will be used to denote positions in relation to the direction in which the vegetable is inserted in or pushed through the passage. Through this lever action of the blade arm, the blade can be moved relatively far in the crosswise direction of the passage, without any substantial change to the contact pressure of the blade against the vegetable. By this means vegetables inserted off-centre or slantwise with respect to the longitudinal central axis of the passage are also peeled largely correctly. In addition, the lever enables the required small contact pressure of the blades against the vegetable to be realized in a simple fashion.

The peeling device is especially compact in design if the device has a plurality of peeling blades of which at least two paired peeling blades are arranged on opposite sides of the periphery of the passage. If several such peeling blades or pairs thereof are arranged in different levels perpendicular to the direction of passage, the vegetable can be peeled in one operation round the whole of its peripheral area. In order that the peeling blades cannot injure the user, it is suitable if the housing reaches over all the blade levels and outwardly covers the peeling blades throughout the periphery of the passage.

In an advantageous embodiment, the peeling blades or pairs thereof are evenly spaced over the periphery of the passage. Since the device embodying the invention has several peeling blades in the region of the passage which treat different peripheral portions of the vegetable, a vegetable can be simply pushed, even manually, through the passage and at the same time be peeled over at least a large portion of its periphery. If the peeling blades are evenly distributed over the periphery of the passage, the vegetable peeled by the device displays a uniform, largely symmetrical cut.

In order to be able to peel a vegetable in only one pass or peeling operation, a preferred embodiment of the invention proposes that the device has preferably three axially spaced pairs of peeling blades evenly distributed over the periphery of the passage. In this embodiment with three pairs of peeling blades, most sorts of vegetable can be fully peeled over their entire periphery and length, even if the vegetable in question is pushed only once through the passage, past the peeling blades. Just for radish it may be advisable to provide two pairs of peeling blades in the region of the passage, whereby the radish to be peeled then has to be pushed through the passage of the device, turned, and pushed through again.

In order that the blade arms are pressed against the vegetable to be peeled separately from one another and can adjust themselves optimally to unevennesses of the vegetable, it is suitable if at least one restoring spring is assigned to each blade arm as a restoring element and if these restoring springs preferably take the form of leg springs.

An advantageous embodiment of the invention proposes that the restoring springs are preferably detachably held in a housing and act upon the associated blade arm particularly on the side facing away from the passage. As the restoring springs are detachably fastened in the housing, it is easier for the device embodying the invention to be put together and taken apart when, for example, it is to be thoroughly cleaned or repaired.

Instead of such restoring springs, however, it may also be suitable for the blade arms to be capable of swinging out against the restoring force of at least one rubber ring.

In one embodiment of the invention, the rubber ring is arranged on the exterior of the housing and the pressure force of the rubber is transferred to the blade arm with the aid of a transfer pin movable radially with respect to the passage. The rubber and the transfer pins are then accessible from the outside of the housing and can be easily removed for cleaning purposes, without the cleaner coming into contact with the sharp blades.

However, the rubber ring may also be arranged inside the housing. In that event, the rubber ring is preferably arranged in such a way as to span, and bear against the outside of, a plurality of blade arms distributed as evenly as possible over the periphery of the passage. The rubber ring is then held by the blade arms in spaced relationship to the passage and cannot come into contact with the stick of asparagus.

This arrangement of the rubber ring is advantageous particularly if and when the housing has an insert carrying the blade arms. The insert is then easy to place in the housing together with the blade arms held together by the rubber ring. Given such a rubber ring acting on the blade arms inside the housing, it is possible to dispense with any further externally arranged rubber rings and transfer pins, at least for the peeling blades having a comparatively short blade arm.

If there are several levels of blades, it is advantageous to arrange some of the rubber rings inside the housing and the others on the exterior of the housing. In this case the rubber rings for the upper levels of blades are suitably arranged internally, whereas the rubber rings for the lower levels of blades are arranged on the exterior of the housing in order that they cannot get into the region of the passage.

A further development of the present invention proposes that the preferably substantially cylindrical or annular housing has on its outer periphery at least one contact point for attaching a pedestal and/or a further housing. Such a development of the housing enables it to be connected in a practically modular fashion to further devices and/or at least one pedestal. In case of such combination, it is suitable if these devices have different peeling blades and/or passages differing in diameter for peeling different vegetables or sorts of vegetables.

One embodiment which is especially simple and easy to handle proposes that each housing has several, preferably three, equi-circumferential contact points and is adapted to be detachably connected to at least one further housing and/or to a pedestal by means of a form-fit joint, particularly by means of a slot and key joint. Such a form-fit joint between the individual housings enables the respective devices to be simply joined and separated. When joining several devices, two of the three contact points of the outer housing may for instance be used for connection to adjacent devices, whereas the third contact point is used for a pedestal. Thus a peeling device composed of several housings can be stably stood.

It is especially advantageous if the blade arms each have a forked holder engaging the associated peeling blade and if the two fork ends engaging the peeling blade are preferably elastically expandable for blade removal. By expanding the fork ends engaging the peeling blade, the peeling blade can be removed from the forked holder and if necessary be replaced by a new peeling blade. Since the preferably elastic fork ends of the holders only have to be expanded for changing the peeling blades, no additional tool is required for blade detachment.

It is especially suitable if the blade arms are made of plastic. Such blade arms made of plastic are not only inexpensive to make, but they do not rust and can also be easily expanded in the region of their elastic, forked holders for removing the peeling blades.

It is advantageous if the peeling blades have journals at either end, engaging with bearing recesses or similar bearing openings of the associated forked holder. This swivel mounting of the peeling blades facilitates their smooth swinging movement and permits their simple detachment from the forked holders of the blade arms.

To limit the swinging movement of the peeling blades in their swivel bearings, a preferred embodiment of the invention proposes that the journals and forked holders have oblique sides in spaced relationship to each other and to the contact surface between the journals and the associated bearing openings. These sides compose co-operating stops and counter stops to limit the tipping and swinging movements of the peeling blades.

The smooth swinging movement of the peeling blades and their good rotary guidance is enhanced if the journals of the peeling blades and the sides of the forked holders defining a bearing opening are rounded in the region of their common contact surface.

A further development of the invention consists in that the peeling blades are in each case connected substantially rigidly to at least one additional feeler. As considered in the direction of insertion, the additional feeler is arranged spaced from the cutting edge of the associated peeling blade to swivel the latter from a non-operative position into a cutting position. The device, serving particularly for peeling asparagus, is in this case designed in such a way that when the asparagus has not yet contacted the additional feelers, the peeling blades are swung out in a non-operative position in which the cutting edges are swivelled outwards. The peeling blades are swung into their cutting position only when the asparagus tip has reached the additional feelers spaced downstream of the cutting edge of the peeling blade. Therefore not the delicate asparagus tip, but only the stick behind it is peeled, as is customary.

In an embodiment of especially simple design, contemplated particularly for peeling asparagus, the swing back of the peeling blades from their cutting position into a non-operative position is accomplished by the centre of gravity of the peeling blades being above the swivel axis of the blades. In this case the device is preferably arranged in such a way that the direction of insertion is substantially in the direction of gravity.

In an advantageous embodiment of the invention there are restoring springs or the like swinging the cutting edge outwards in the non-operative state of the blades. Such an embodiment can then be used in any operating positions.

If the asparagus is pushed tip first into the passage, the asparagus tip moves past the outwardly deflected cutting edges, without contacting them. As soon as the tip touches the additional feelers, the peeling blades are pressed against the vegetable. The blades associated to the additional feelers hence swing from the non-operative position into the cutting position and the cutting operation begins. By means of the additional feelers it is hence achieved that the peeling operation begins only after the asparagus tip, hence at its neck, and the delicate tip is not damaged by the blades.

If the device embodying the invention is to be used for peeling carrots, cucumbers or similar elongated vegetables, it is suitable if the peeling blades in each case have a peel deflector arranged downstream of their cutting edge. That free, end portion of the deflector which is remote from the cutting edge is preferably angled or bent outwards. The opposite portion of the deflector bears in particular against the outside of the cutting blade and/or joins the cutting blade. The vegetable peel sliding along the outer surface of the peeling blade downstream of the cutting edge is deflected outwards by the peel deflector. Therefore it can no longer come within reach of and interfere with downstream peeling blades.

If the vegetables are to be fully peeled throughout their length, it is suitable if the centre of gravity of the peeling blades is below the swivel axis of the blades. This arrangement of the centre of gravity of the peeling blades practically ensures that the peeling blades are in their cutting position even when in their non-operative state.

A preferred embodiment of the invention proposes that as considered in the direction of insertion, the front, free end area of the feelers is in each case preferably angled outwards in a funnel shape counter to the direction of insertion. Particularly if at least one restoring spring is assigned to each blade arm as restoring element, this funnel-shaped configuration of the feelers arranged upstream of the cutting edges means that a wide variety of vegetables with a wide range of diameters are encompassed by the peeling blades and peeled in the device embodying the invention.

Further features of the invention follow from the description given below of exemplary embodiments of the invention, taken in conjunction with the claims and drawings. The individual features may be realized singly or severally in an embodiment of the invention.

A peeling device and parts thereof are depicted in the drawings on different scales and partly in schematized form, in which FIG. 1 is a partly sectional side view of a peeling device, showing the two upper blades of the pairs thereof distributed over altogether three levels, FIG. 2 is a fragmentary, partly sectional view of the peeling device of FIG. 1 in the region of the passage, depicting a blade arm in different swivel positions, FIG. 3 is a front view of a peeling blade of the peeling device of FIG. 1, showing part of the blade arm, FIG. 4 is a side view of a peeling blade of FIG. 3, showing part of the blade arm, FIG. 5 is a fragmentary, partly sectional view of the peeling device of FIGS. 1 to 4 in the region of the passage, as the peeling operation commences, FIG. 6 is a fragmentary, partly sectional side view of a peeling device similar to that of FIGS. 1 to 4, wherein a restoring spring as restoring element is assigned to each of the blade arms of the peeling device and holds the associated arm in the region of the passage of the peeling device, FIG. 7 is a plan view of the peeling device of FIG. 6, FIG. 8 is the peeling device in a sectional side view turned through 90° compared to that in FIG. 6, FIG. 9 is a blade arm in the region of the swivel bearing of its peeling blade, FIG. 10 is a front view of a peeling blade for the peeling device of FIG. 6, whereby the peeling blade has an additional feeler arranged downstream of the cutting edge and is provided particularly for peeling asparagus, FIG. 11 is a plan view of the peeling blade of FIG. 10, FIG. 12 is a side view of the peeling blade of FIGS. 10 and 11, FIG. 13 is a side sectional view of the peeling blade of FIGS. 10 to 12, FIG. 14 is a front view of a peeling blade, whereby a peel deflector is arranged downstream of the cutting edge of the peeling blade, FIG. 15 is a plan view of the peeling blade of FIG. 14, FIG. 16 is a side view of the peeling blade of FIGS. 14 and 15 and FIG. 17 is a side sectional view of the peeling blade of FIGS. 14 to 16.

DETAILED DESCRIPTION OF PREFERRED EMBODIMENTS

Figure 1:
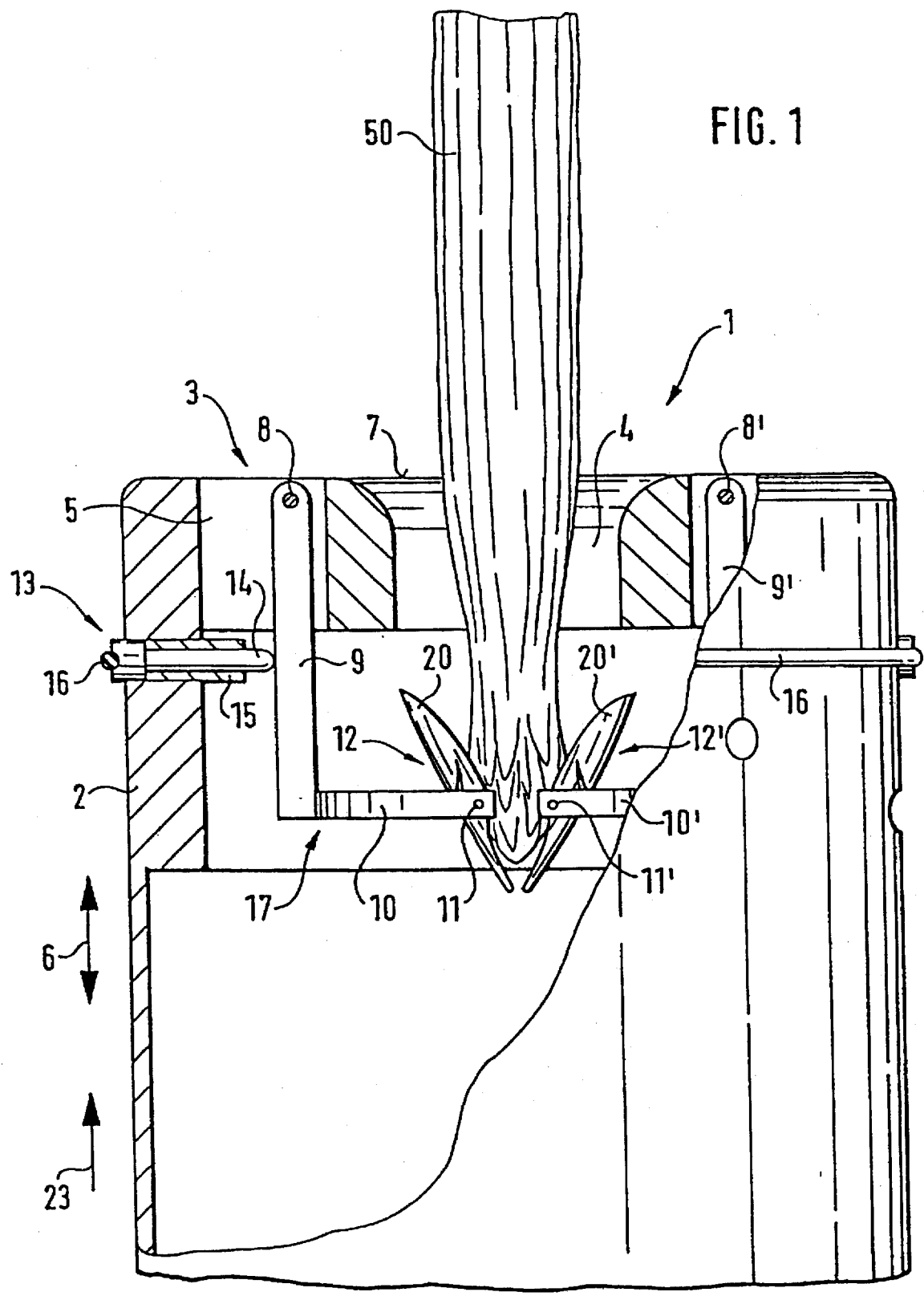
Figure 2:
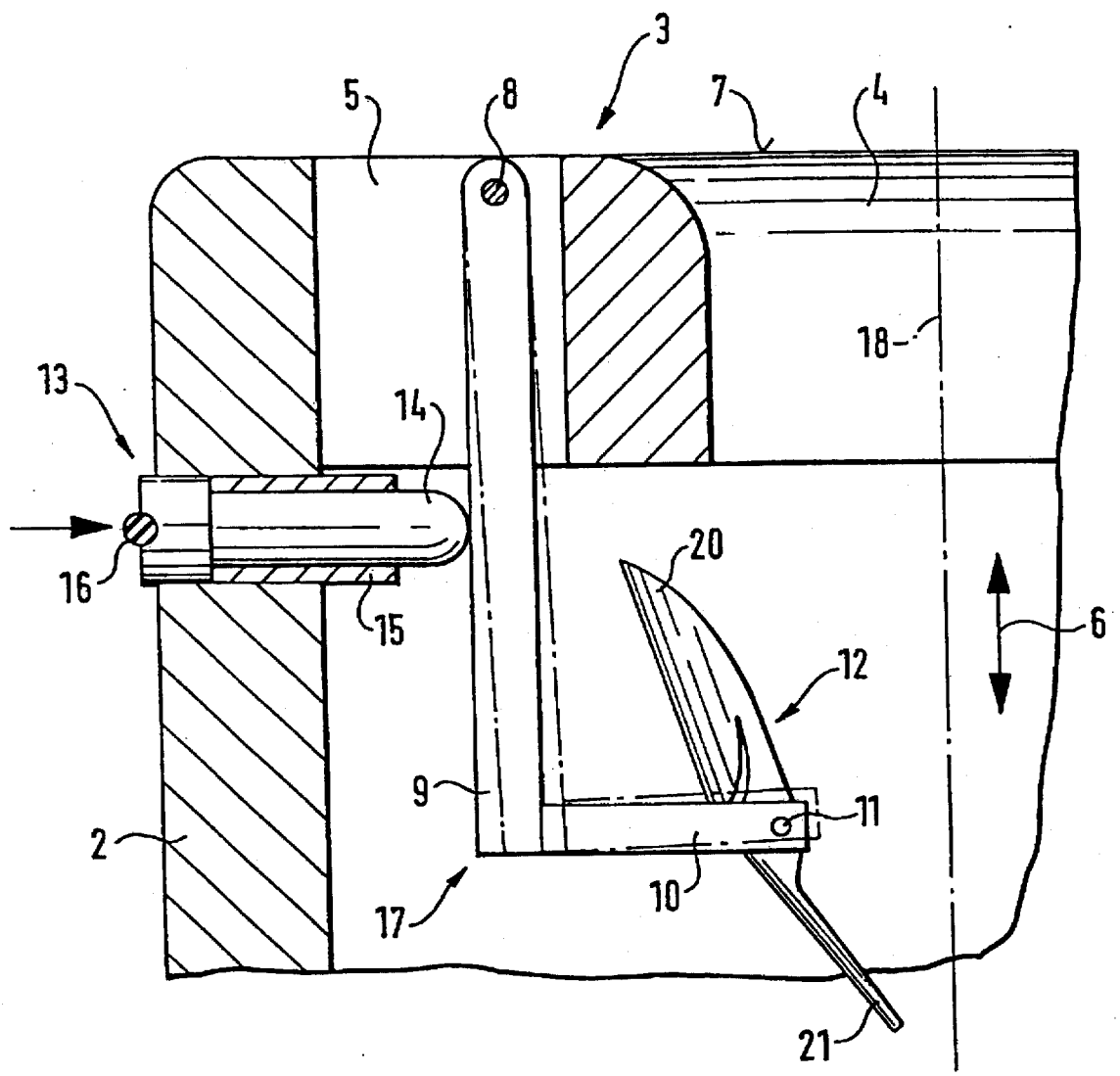

FIG. 1 shows a partly sectional view of a peeling device having a substantially cylindrical housing 2. The housing 2 has an insert 3 with a passage 4 extending generally concentrically with respect to the longitudinal central axis of the housing 2. The passage 4 is of substantially cylindrical shape in its middle and lower area, flaring in a funnel shape in its upper area. The insert 3 has altogether six external grooves 5 evenly distributed over the periphery of the passage 4. The grooves 5 extend in the longitudinal direction 6 of the passage 4 and in cross section are arranged radially with respect to its longitudinal central axis. In each of the six grooves 5 there is one swivel bearing 8 for a blade arm 9 extending into the respective groove 5 and projecting into the interior of the housing 2. The swivel bearing 8 is located in the region of the top 7 of the insert, approximately in the centre of the groove 5. The free end of the blade arm 9 carries a forked holder 10 of generally semicircular shape. The forked holder 10 is centrally and rigidly connected to the blade arm 9 at an angle of 90° and has a swivel bearing 11 at either end for swivel mounting a blade 12. A transfer element 13, which is movable radially with respect to the passage 4, engages the blade arm 9 approximately midway. The transfer element 13 consists of a press pin 14 surrounded in part by a sheath 15 to reduce the external friction. On the exterior of the housing 2, the press pin 14 has a groove running in the circumferential direction of the housing 2. Inserted in the groove is a rubber ring 16 which extends round the periphery the housing 2 and subjects the press pin 14 to pressure directed towards the blade arm 9. The blade holder 17 and the blade 12 are thereby deflected in the direction of the longitudinal central axis 18 of the passage 4, according to FIG. 2.

The rubber ring 16 also acts upon a second transfer element (not shown) arranged on the periphery of the insert 3 so as to be rotationally staggered through 180° with respect to the first transfer element. The second transfer element acts upon a blade arm 9' which extends into the groove 5' opposite groove 5 and on a holder 10' carries a further blade 12' which in relation to blade 12 is rotationally staggered through 180° with respect to the longitudinal central axis 18 of the passage 4. The peeling device 1 thus has a pair of blades 12, 12' arranged in a plane perpendicular to the longitudinal central axis 18.

Beneath the latter level of blades are two further ones each about 10 mm apart. Each level has a pair of blades which, in relation to the level above, is rotationally staggered through 120° with respect to the longitudinal central axis 18 of the passage 4. Hence there are altogether six blades evenly distributed over the periphery of the passage 4. The individual levels of blades each have a separate rubber ring 16, so that the blades 12, 12' can be deflected largely independently of one another, without causing any substantial change in the contact pressure of the other blades.

The insert 3 can be removed from the housing together with the blades 12, 12' and blade holders 17, 17', allowing the inside of the peeling device 1 to be simply cleaned.

Figure 3:
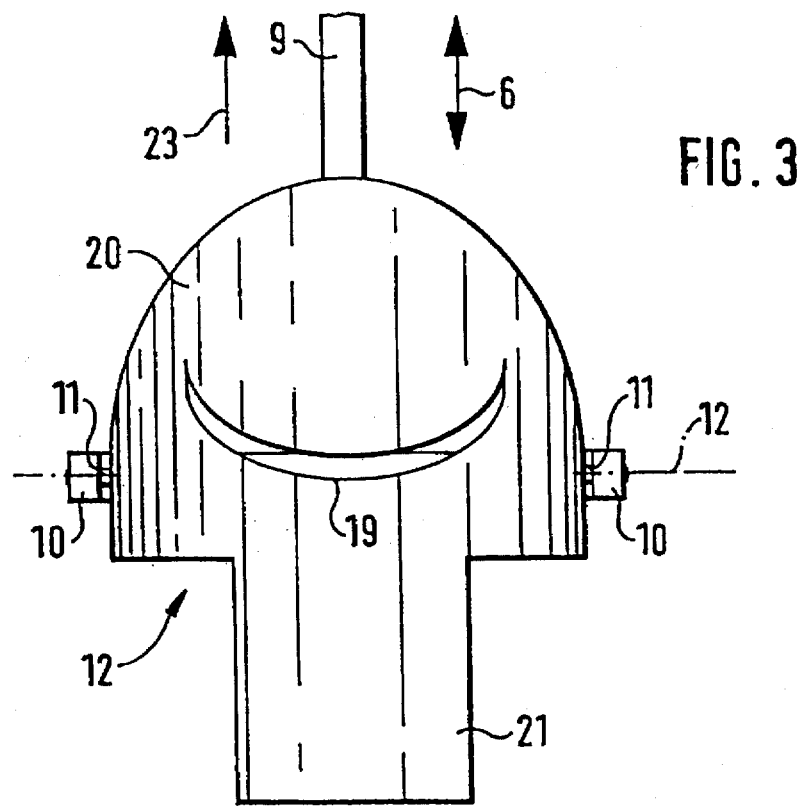

FIG. 3 illustrates a front view of the blade 12, showing the two swivel bearings 11 which are arranged approximately level with the cutting edge 19 and engage with the holding element 10.

The blade 12 is cylindrically bent in the direction of the swivel axis 22, the radius of bend corresponding approximately to the radius of a very large stick of asparagus 50. By this means, thin as well as thick sticks 50 can be treated by the device 1, without having to change the blades 12, 12' in number or arrangement. Conditioned by the cylindrical bend of the blade 12, only the central area of the cutting edge 19 lies against the periphery of a thin stick 50, peeling only a comparatively narrow strip of the outer skin. In the case of thick sticks 50, the cutting edge 19 contacts a substantially wider strip of outer skin 53, 53', so that the stick of asparagus 50 is also peeled round the whole of its peripheral area.

The cutting edge 19 is also bent in the shape of a circle segment in the longitudinal direction 6 of the passage 4, improving the cutting action of the blade 12 particularly when cutting into the asparagus.

Figure 4:
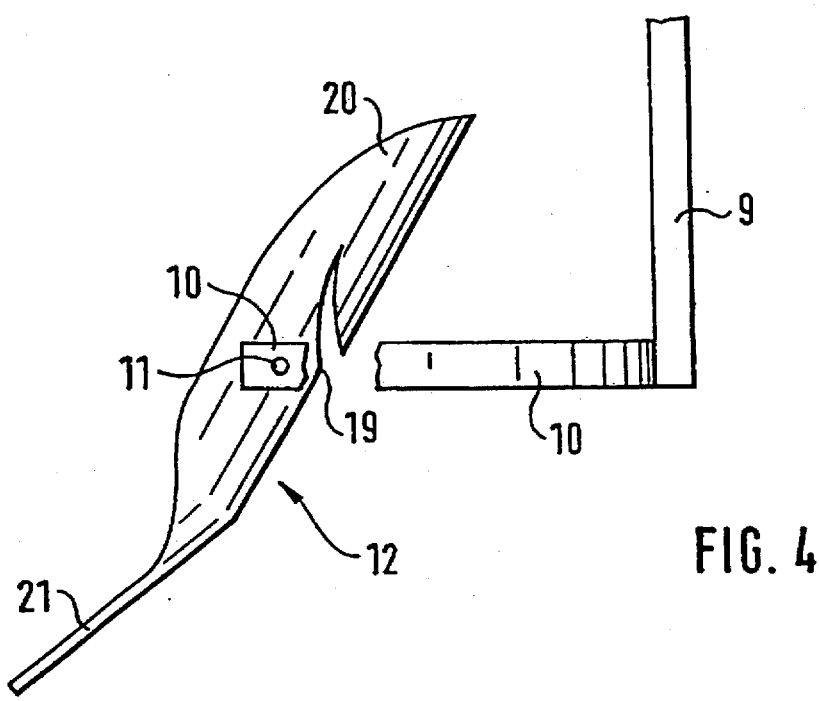

On the side situated in the cutting direction 23, the blade 12 furthermore has a feeler 20 rigidly connected to the cutting edge 19. On the side of the blade 12 facing away from the feeler 20 is an additional feeler 21 likewise rigidly connected to the cutting edge 19. FIG. 4 represents a side view of the blade 12, showing feeler 20 and additional feeler 21.

Figure 5:
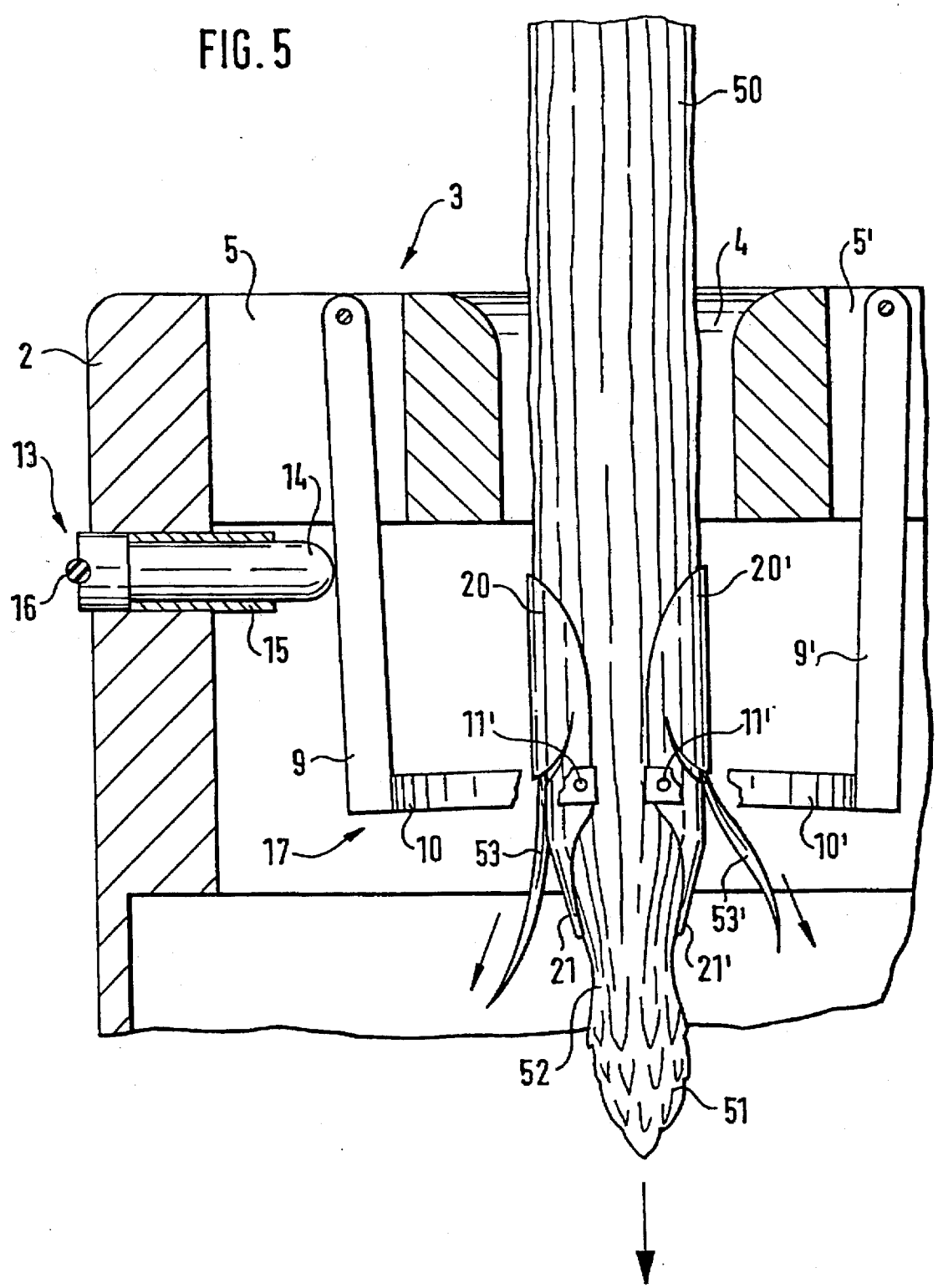

The functions of feeler 20 and additional feeler 21 will be explained below with reference to FIGS. 1 and 5. Before the asparagus 50 is inserted in the passage 4, the blades 12, 12' are in their non-operative position in which the feelers 20, 20' are deflected by gravity towards the blade arms 9, 9'.

The asparagus 50 is now inserted lengthwise, tip 51 first, in the passage 4. In so doing, the asparagus tip 51 contacts the additional feelers 21, 21' and deflects them outwards (FIG. 1). As a result, the feelers 20, 20' swivel inwards and lie against the outer surface of the asparagus at about the level of the asparagus neck 52 (FIG. 5). At the same time the cutting edges 19, 19' contact the asparagus 50 and the cutting operation begins. The additional feelers 21, 21' hence cause the peeling operation to begin only after the asparagus tip 51, at about the level of the asparagus neck 52. For this purpose the distance between the swivel bearings 11, 11' and the lower edge of the additional feeler 21, 21' is adapted to about the length of the asparagus tip 51. During the cutting operation the feeler 20, 20' slides along the outer surface of the asparagus 50 and prevents the cutting edge 19, 19' from swivelling too far into the asparagus. The cutting direction of the blades 12, 12' thereby extends tangentially to the outside of the asparagus 50, achieving a uniform depth of cut.

To facilitate inserting the sticks of asparagus 50 in the passage 4 and removing them at the opposite end of the peeling device 1, the housing 2 of the peeling device 1 is suitably fastened to a holding arm in such a way that the top side and bottom side of the peeling device 1 are freely accessible. By way of example, the holding arm may have a pedestal for standing the device or it may be clamped to a tabletop, for instance, by a clamping device.

Figure 6:
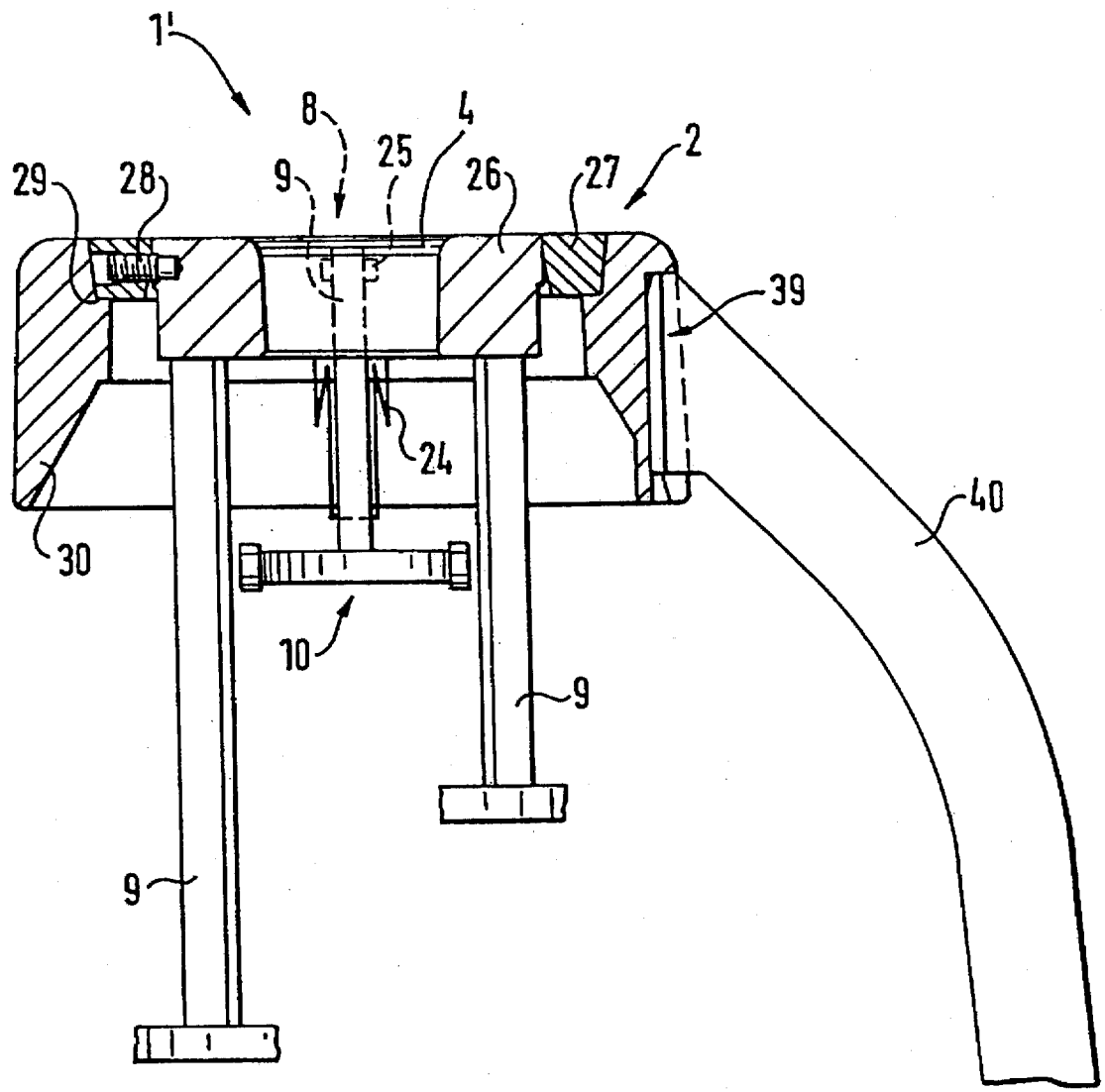

FIG. 6 illustrates the preferred embodiment of a peeling device 1' largely conforming with the peeling device 1 of FIGS. 1 to 5. The device 1' also has a passage 4 for passing through the vegetable to be peeled. A plurality of peeling blades 12 acting upon the peripheral area of the vegetable are provided in the region of the passage 4 of the peeling device 1'. One blade arm 9 is associated to each peeling blade 12 and has a forked holder 10 for the respective peeling blade 12.

The blade arms 9 are in each case mounted so as to be capable of swinging out against the restoring force of a restoring spring 24 in the housing 2 of the peeling device 1'. The restoring springs 24 each associated to a blade arm are here in the form of leg springs. The leg springs have their free spring wire ends detachably held in insert openings of the housing 2 and act upon the associated blade arm 9 on the side facing away from the passage 4.

As becomes apparent from FIG. 6, the blade arms 9 with their swivel axes 25 are in each case rotatable in a bearing recess of an inner housing ring 26. The blade arms are secured in these bearing recesses by a central housing ring 27 which is slipped onto a portion of the inner housing ring and held in position there by fasteners 28. The central housing ring 27 rests on the inner annular flange 29 of an outer housing ring 30 and can be removed upwardly from there counter to the direction of insertion.

The swivel axes 25 of the blade arms 9 are spaced upstream of the peeling blades 12.

Of the six peeling blades 12 and appertaining blade arms 9 of the peeling device 1', two paired peeling blades 12 at a time are arranged on opposite sides of the periphery of the passage 4. These pairs of peeling blades are arranged in staggered relationship to one another in the longitudinal direction of the passage 4.

Figure 9:
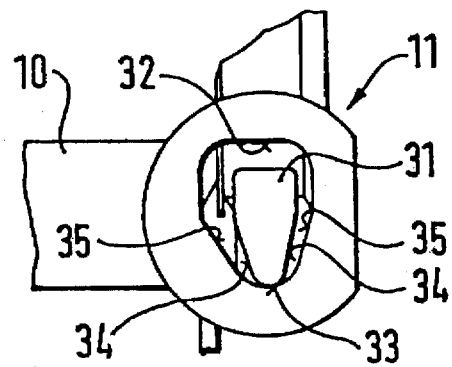
Figure 10:
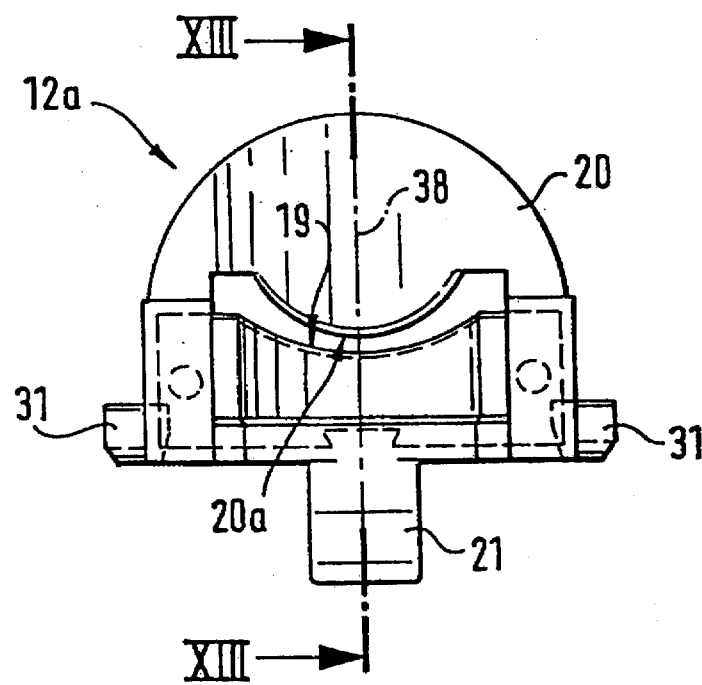
Figure 11:
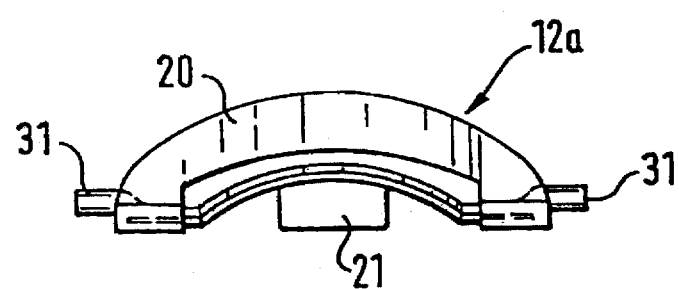
Figure 12:
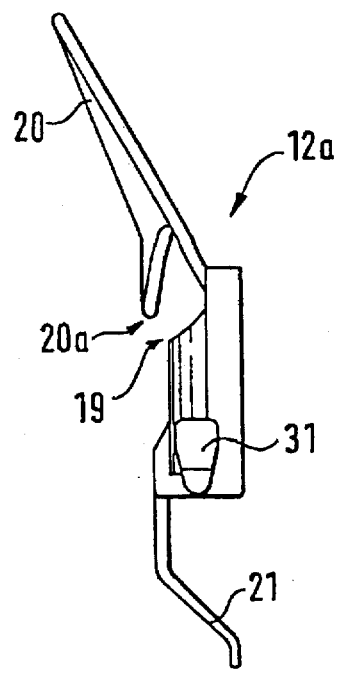

The peeling blades 12 have journals 31 at either side, each engaging with a bearing opening 32 in the associated forked holder 10. Journals 31 and forked holders 10 have oblique sides 34 and 35 in spaced relationship to each other and to the contact surface 33 between the journals 31 and the associated bearing openings 32. These sides 34 and 35 compose co-operating stops and counter stops to limit the tipping and swivel movements of the peeling blades 12. Journals 31 and bearing openings 32 in each case compose a swivel bearing 11. The peeling blades 12 rotatable in these swivel bearings 11 can adapt well to the outside surface of a vegetable as it is pushed through. To enable the peeling blades 12 to be evenly guided and rotated during these swivel movements, the journals 31 of the peeling blades 12 and the sides 35 of the forked holders 10 defining a bearing opening 32 are rounded in the region of their common contact surface 33, as is clear particularly from the detail of FIG. 9.

The blade arms 9 are here made of plastic. As a result of this and as a result of the dimensioning and configuration of the forked holders 10, the two fork ends applied to a peeling blade 12 are elastically expandable for blade removable, without requiring much effort or a special tool.

These peeling blades 12 can therefore be simply detached and replaced by new or different peeling blades 12.

It may also be advisable to change the peeling blades if, for example, the thickness of peel is to be altered. The fixed distance between the cutting edge 19 on the one hand and the opposite free end area 20a of the feeler 20 on the other hand determines the thickness of peel. The thickness of peel can be selectively varied by simply replacing the blades 12, 12a and/or 12b by blades having a different radial distance between the blade portions 19, 20a.

As shown by FIGS. 10 to 13 on the one hand and FIGS. 14 to 17 on the other hand, two different blade types are provided for the peeling device 1'.

Similarly as in FIGS. 1 to 5, the peeling blade 12a shown in FIGS. 10 to 13 serves particularly for peeling asparagus. It has an additional feeler 21 arranged downstream of the cutting edge 19. Since the centre of gravity of the peeling blade 12a in FIGS. 10 to 13 is above the swivel axis 11 of the blade, the peeling blade can swivel by itself into its non-operative position in which the feeler 20 points outwards and the additional feeler 21 points to the passage 4.

As a stick of asparagus is pushed through the passage 4 of the peeling device 1', the peeling blade 12a is moved into its cutting position when the delicate asparagus tip touches the additional feeler 21. Since the asparagus tip has then already passed the cutting edge 19, not the tip but only the stick of asparagus is peeled, as is customary.

In contradistinction the peeling blade 12b illustrated in FIGS. 14 to 17 is provided for vegetables which are to be peeled throughout their length. Instead of having an additional feeler 21, the peeling blade 12b of FIGS. 14 to 17 has a peel deflector 36 arranged downstream of the cutting edge 19.

Whereas the portion of the peel deflector 36 facing the cutting blade 12b bears against the outside of the cutting blade, the opposite, free end portion 37 thereof is angled outwards. The vegetable peel removed by the cutting edge 19 therefore slides over the peel deflector 36 outwards where it can no longer come within reach of and interfere with neighbouring, downstream peeling blades 12b.

Figure 16:
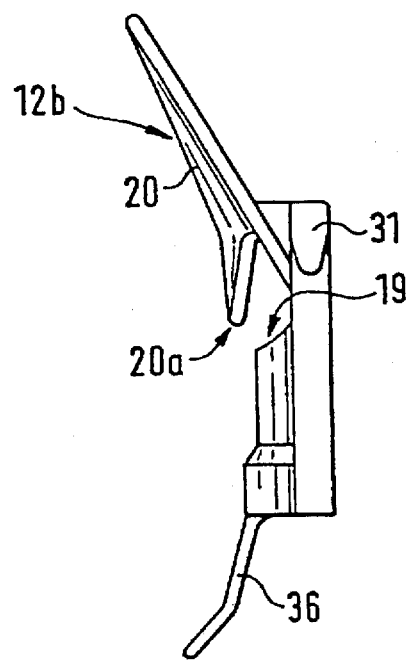
Figure 17:
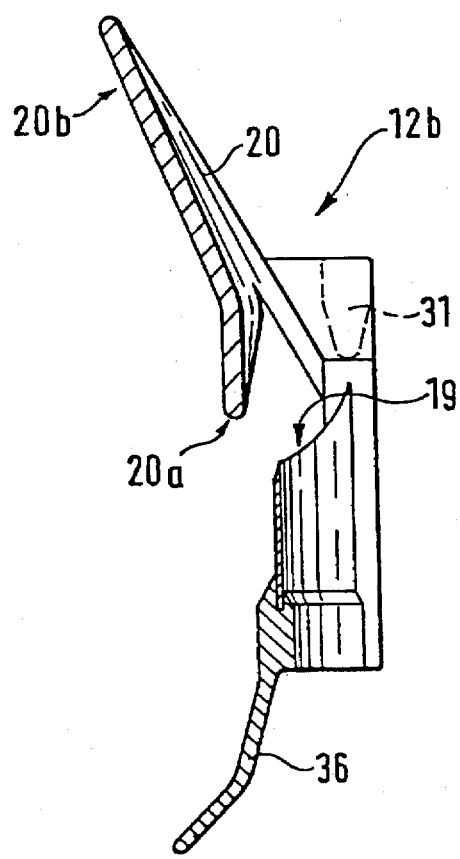

Since the centre of gravity of the peeling blade 12b is beneath the swivel axis 11, the peeling blades 12b when idle are also held in the cutting position illustrated in FIGS. 16 and 17. In comparing FIGS. 10 to 13 and FIGS. 14 to 17 it becomes clear that the journal 31 of cutting blade 12b is arranged in the region of the feeler 20 and the journal 31 of cutting blade 12a is spaced downstream of the cutting edge 19.

The cutting blades 12a and 12b of convex curvature in cross section are circular arc-shaped at the mutually adjacent sides of cutting edge 19 and feeler 20. Since, compared to the feelers 20, the circular arc shape of the cutting edge 19 has a larger radius in the longitudinal direction and a smaller radius in cross section, the distance between the mutually adjacent sides of cutting blades 12, 12b and feelers 20 increases outwardly from about either side of their longitudinal central axis 38. In their outer edge area the mutually adjacent sides of cutting blades 12a, 12b and associated feelers 20 extend spaced from and parallel to the respective swivel axis. By virtue of this configuration of the peeling blades 12a, 12b, the vegetable skin is easily intercepted and guided well during the peeling operation, without being able to lodge at the outer edge areas between peeling blades and feelers 20.

Figure 13:
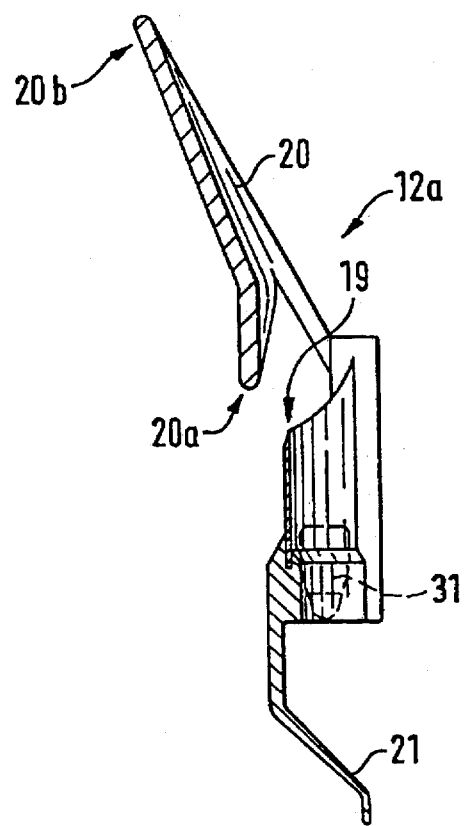
Figure 14:
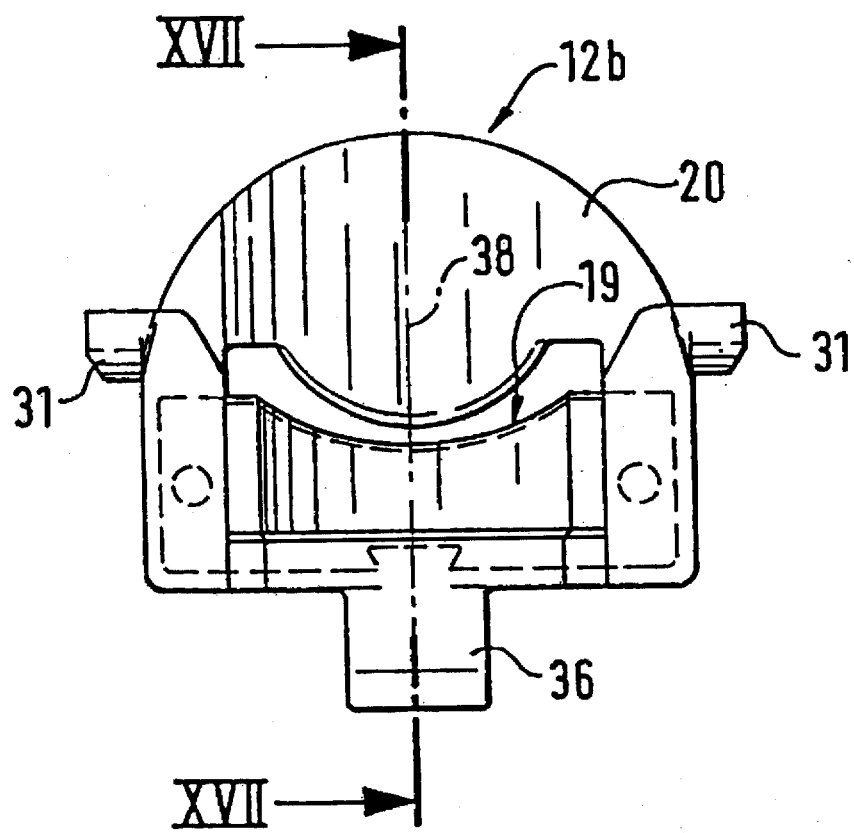
Figure 15:
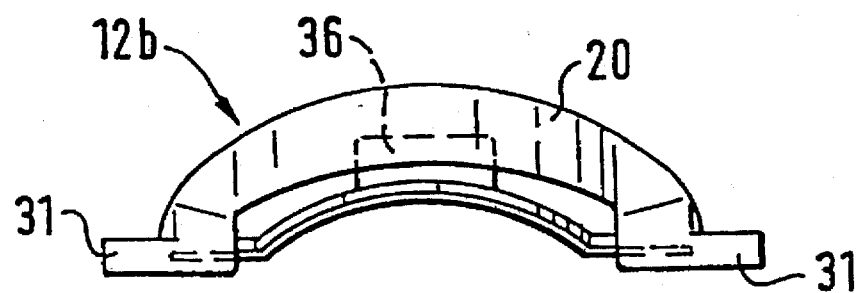

FIGS. 13 and 17 clearly show that the free end area 205 of the feelers 20 is preferably angled outwards in a funnel shape counter to the direction of insertion. This funnel-shaped configuration of the feelers 20 ensures that even when vegetables differing greatly in diameter are pushed into the passage of the device 1', they are sure to be intercepted by the peeling blades. This automatic adjustment of the device 1' to the differing diameter possibly conditioned by the sort of item to be peeled is further enhanced by the restoring springs 24 serving as restoring elements. Before every peeling operation, the blade arms and the peeling blades they hold are moved back by the restoring springs to an initial position corresponding to an item of comparatively small diameter. By means of the funnel-shaped configuration of the feelers 20, larger vegetables such as cucumbers for instance, are also encompassed by the peeling blades 12. During the peeling operation, the blade arms 9 adjust themselves to the thickness and unevennesses of the surface of the respective vegetable against the restoring force of the restoring springs 24.

Figure 7:
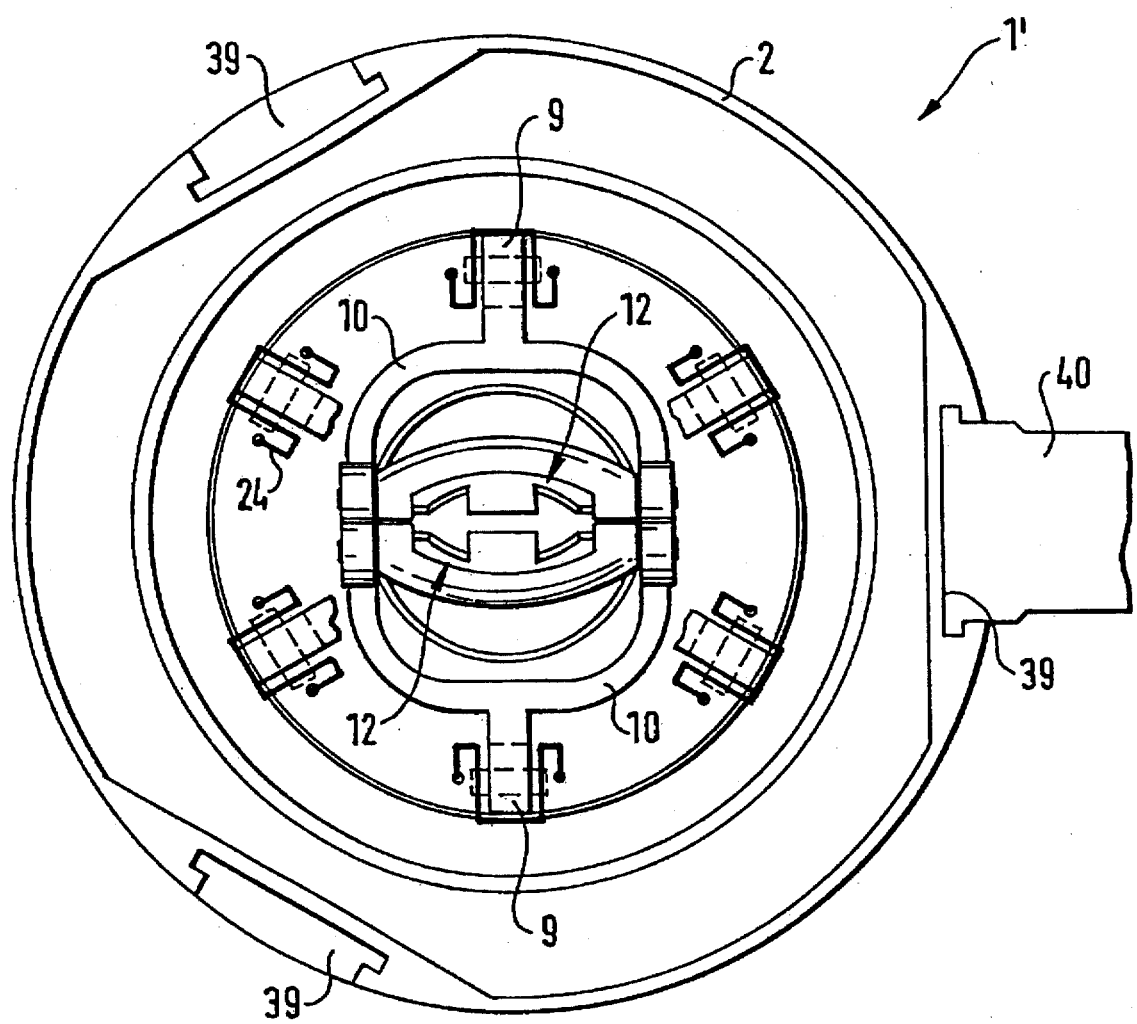
Figure 8:
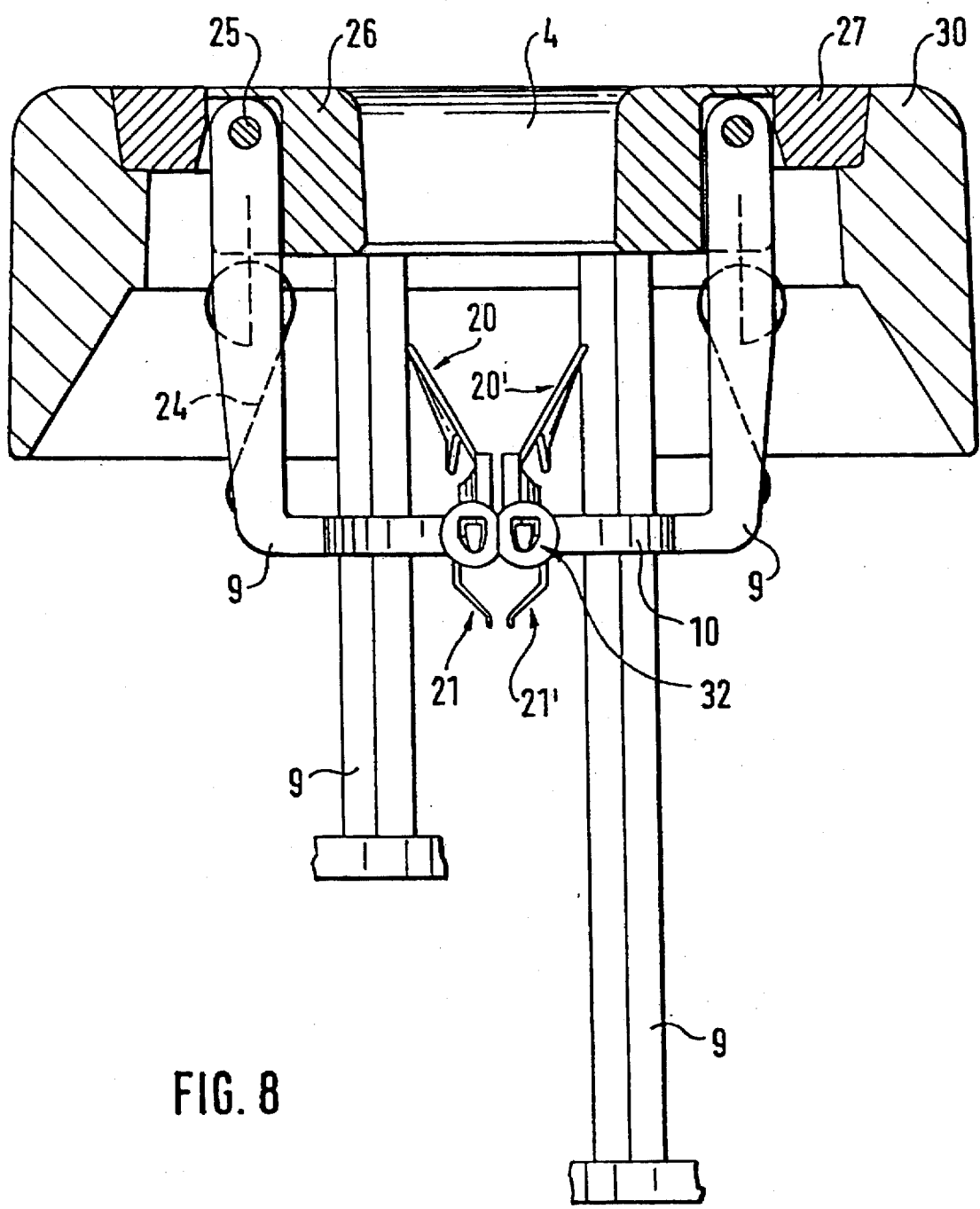

As is apparent from FIGS. 6 and 7, the peeling device 1' has three contact points 39 evenly distributed over the outer periphery of the housing 2. The contact points 39 serve for connecting this housing 2 to a further housing 2 of another peeling device 1' or—as here—to a pedestal 40. At the contact points 39 the housing 2 of the peeling device 1' can be connected by means of a slot and key joint to at least one further housing having e.g. different peeling blades 12, 12a, 12b for peeling other vegetables or a larger or smaller passage. The housings 2 of the peeling devices 1' can hence be combined in a practically modular fashion to form a larger peeling device.

With the aid of the peeling device 1', asparagus or other elongated vegetables can also be manually peeled quickly and simply on a relatively large scale, with practically no risk of injury.

I claim:

1. A device for peeling elongated vegetables comprising:
    a housing having a passage defined therethrough, the passage extending in a longitudinal direction of the housing and having a first end adapted for insertion of a vegetable into the passage, which defines a direction of vegetable insertion, and a second end adapted for removal of the vegetable from the passage;
    a peeling blade located in the housing in proximity to the passage, the peeling blade having a cutting edge adapted to act on a periphery of a vegetable and being movably mounted for movement crosswise to the longitudinal direction to press against the vegetable; and
    a feeler connected to the peeling blade, the feeler being located upstream of the blade in the direction of vegetable insertion and being adapted to lie against a periphery of the vegetable.

2. The device of claim 1, further comprising a blade arm pivotably mounted to the housing about a swivel axis, the blade being mounted on the blade arm, the swivel axis being located in an upstream position from the cutting edge of the blade in the direction of vegetable insertion; and
    a restoring element which biases the blade arm toward the passage.

3. The device of claim 1, wherein a plurality of peeling blades are located in the housing, and at least two blades are arranged substantially on opposite sides of the passage.

4. The device of claim 1, wherein a plurality of peeling blades are located in the housing and are arranged in staggered relationship in the longitudinal direction of the passage.

5. The device of claim 1, wherein the passage has a periphery and a plurality of peeling blades are located in the housing, the peeling blades being evenly distributed around the periphery of the passage.

6. The device of claim 5, further comprising a plurality of blade arms pivotably mounted to the housing, each of the plurality of blades being mounted on a respective blade arm; and
    at least one restoring spring acting on each blade arm as a restoring element, the at least one restoring spring comprising a leg spring.

7. The device of claim 6, wherein the restoring springs are detachably held in the housing and act upon each of the respective blade arms on a side of the respective blade arm facing away from the passage.

8. The device of claim 2, wherein the restoring element comprises a rubber ring located on the housing, and the blade arm is capable of swinging out against a restoring force of the rubber ring.

9. The device of claim 2, wherein a plurality of peeling blades are located in the housing, and a plurality of blade arms pivotably mounted to the housing, each of the plurality of blades being mounted on a respective blade arm; and
the restoring element comprises at least one rubber ring which acts on a pair of blade arms to bias the pair of blade arms and the respective blades towards the passage.

10. The device of claim 9, further comprising a plurality of transfer pins slidably mounted in the housing, each transfer pin being aligned with a respective blade arm, the at least one rubber ring being arranged on an outer periphery of the housing and contacting at least one of the transfer pins such that each contacted transfer pin bears against the respective blade arm and is guided in the housing so as to be movable approximately radially with respect to the passage.

11. The device of claim 1, further comprising a blade arm pivotably mounted to the housing about a swivel axis, the blade being mounted on the blade arm, the swivel axis being located in a position upstream from the cutting edge in the direction of vegetable insertion;
    a rubber ring being arranged on an outer periphery of the housing; and
    a transfer pin slidably located in the housing having a first end in contact with the rubber ring and a second end which bears against the blade arm, the transfer pin being guided in the housing so as to be movable approximately radially with respect the passage.

12. The device of claim 1, wherein the housing is substantially cylindrical and includes an outer periphery, and at least one contact point for attaching a pedestal is located on the outer periphery.

13. The device of claim 1, wherein the housing includes three, equi-circumferential contact points, with a connector located at each contact point, the connectors being adapted to be detachably connected to at least one of a housing of a similar device and a pedestal.

14. The device of claim 2, wherein the blade arm includes a forked holder having two fork ends, and the peeling blade is supported in the forked holder with the two fork ends engaging the peeling blade, the two forked ends being elastically expandable for blade removal.

15. The device of claim 14, wherein the blade arm is made of plastic.

16. The device of claim 14, wherein the peeling blade includes journals located at either end, and bearing openings are located on the two forked ends, the journals being engaged in the bearing openings.

17. The device of claim 16, wherein the journals and forked holder have oblique sides in spaced relationship to each other, and a contact surface for the oblique journal sides is provided by the oblique sides of the associated bearing openings, said sides composing cooperating stops and counter stops to limit the movement of the peeling blade.

18. The device of claim 17, wherein the journals of the peeling blade and the sides of the forked holders are rounded in a region of a support surface.

19. The device of claim 1, wherein a second feeler is connected to the peeling blade, the second feeler being located in a downstream position from the cutting edge in the direction of vegetable insertion, the second feeler being adapted to swivel the cutting edge from a non-operative position into a cutting position.

20. The device of claim 19, wherein the center of gravity of the peeling blade is above the swivel axis.

21. The device of claim 1, wherein a restoring spring is connected to the peeling blade and swings the peeling blade with its cutting edge outwards in a non-operative state.

22. The device of claim 1, wherein the peeling blade includes a peel deflector arranged downstream of the cutting edge in the direction of vegetable insertion, said deflector having a free end portion which is remote from the cutting edge and is angled outwards from the passage.

23. The device of claim 22, wherein the center of gravity of the peeling blades (12b) is below the swivel axis (11).

24. The device of claim 22, wherein the cutting blade and feeler have sides which are mutually adjacent and are circular arc shaped in a region of the cutting blade, and a distance between the sides of the cutting blade and the feeler which are mutually adjacent increases outwardly from about either side of a longitudinal central axis, and the cutting blade has a larger radius than the feeler.

25. The device of claim 24, wherein in an outer edge area, the mutually adjacent sides of the cutting blade and the feeler are spaced from and extend parallel to the swivel axis of the blade.

26. The device of claim 19, wherein the feeler connected to the peeling blade and the second feeler are of convex curvature in cross section.

27. The device of claim 1, wherein the peeling blade has a cutting edge of concave curvature.

28. The device of claim 1, wherein the device includes three axially spaced pairs of peeling blades evenly distributed around the passage.

29. The device of claim 1, wherein the feeler has a free end area which is angled outwards from the passage in a funnel shape counter to the direction of insertion.

* * * * *